(12) United States Patent
Goodrich

(10) Patent No.: US 7,360,023 B2
(45) Date of Patent: Apr. 15, 2008

(54) METHOD AND SYSTEM FOR REDUCING POWER CONSUMPTION IN A CACHE MEMORY

(75) Inventor: Allen Bruce Goodrich, Tel Aviv (IL)

(73) Assignee: Starcore, LLC, Austin, TX (US)

( * ) Notice: Subject to any disclaimer, the term of this patent is extended or adjusted under 35 U.S.C. 154(b) by 195 days.

(21) Appl. No.: 10/675,432

(22) Filed: Sep. 30, 2003

(65) Prior Publication Data

US 2005/0071565 A1 Mar. 31, 2005

(51) Int. Cl.
*G06F 12/00* (2006.01)

(52) U.S. Cl. .......................... 711/128; 365/226; 365/49

(58) Field of Classification Search ................ 711/128; 365/226, 227
See application file for complete search history.

(56) References Cited

U.S. PATENT DOCUMENTS

| | | | |
|---|---|---|---|
| 5,517,626 A | 5/1996 | Archer et al. | |
| 5,544,342 A | 8/1996 | Dean | |
| 5,761,715 A * | 6/1998 | Takahashi | 711/128 |
| 5,761,723 A * | 6/1998 | Black et al. | 711/144 |
| 5,781,925 A | 7/1998 | Larson et al. | |
| 5,805,907 A | 9/1998 | Loper et al. | |
| 5,848,428 A * | 12/1998 | Collins | 711/127 |
| 6,151,664 A | 11/2000 | Borkenhagen et al. | |
| 6,347,063 B1 | 2/2002 | Dosaka et al. | |
| 6,591,294 B2 | 7/2003 | Kawasaki et al. | |
| 6,604,151 B1 | 8/2003 | Date et al. | |
| 6,845,432 B2 * | 1/2005 | Maiyuran et al. | 711/154 |
| 6,944,714 B2 * | 9/2005 | Lesarte et al. | 711/128 |
| 2002/0083267 A1 * | 6/2002 | Shimazaki et al. | 711/118 |
| 2004/0024952 A1 * | 2/2004 | Bains et al. | 711/5 |
| 2004/0199723 A1 * | 10/2004 | Shelor | 711/128 |
| 2004/0210728 A1 * | 10/2004 | Flautner et al. | 711/156 |

FOREIGN PATENT DOCUMENTS

| | | |
|---|---|---|
| EP | 0694844 A1 | 1/1996 |
| EP | 0992916 A1 | 4/2000 |
| EP | 1001606 A2 | 5/2000 |
| EP | 1107110 A2 | 6/2001 |

* cited by examiner

*Primary Examiner*—Matthew Kim
*Assistant Examiner*—Ryan Dare
(74) *Attorney, Agent, or Firm*—Steve Mendelsohn

(57) ABSTRACT

A method and system are for reducing power consumption in a multi-way set-associative cache memory. During a first clock cycle, in response to an address, an associated set is identified in the cache memory. The address is compared to respective tag portions of blocks in the associated set, and a signal is output in response thereto. During a second clock cycle, in response to the signal indicating a match between one of the blocks and the address, a non-tag portion of the matching block in the associated set is read, while a non-matching block in the associated set is disabled.

9 Claims, 4 Drawing Sheets

METHOD AND SYSTEM FOR REDUCING POWER CONSUMPTION IN A CACHE MEMORY

BACKGROUND

The disclosures herein relate generally to information handling systems and in particular to a method and system for reducing power consumption in a cache memory.

Many information handling systems include both a system memory and a cache memory. A cache memory is a relatively small high-speed memory that stores a copy of information from one or more portions of the system memory. The cache memory may be integral or non-integral with other components of the system.

A cache memory may consume a substantial amount of power, especially if the cache memory is accessed frequently. Accordingly, it has become important to reduce the cache memory's power consumption. For example, by reducing the cache memory's power consumption, a period of time may be extended before recharging or replacing a battery.

A need has arisen for a method and system for reducing power consumption in a cache memory, in which a cache memory consumes less power relative to previous techniques.

SUMMARY

One embodiment, accordingly, provides a method and system for reducing power consumption in a multi-way set-associative cache memory. During a first clock cycle, in response to an address, an associated set is identified in the cache memory. The address is compared to respective tag portions of blocks in the associated set, and a signal is output in response thereto. During a second clock cycle, in response to the signal indicating a match between one of the blocks and the address, a non-tag portion of the matching block in the associated set is read, while a non-matching block in the associated set is disabled.

A principal advantage of this embodiment is that a cache memory consumes less power relative to previous techniques.

DETAILED DESCRIPTION

Figure 1:
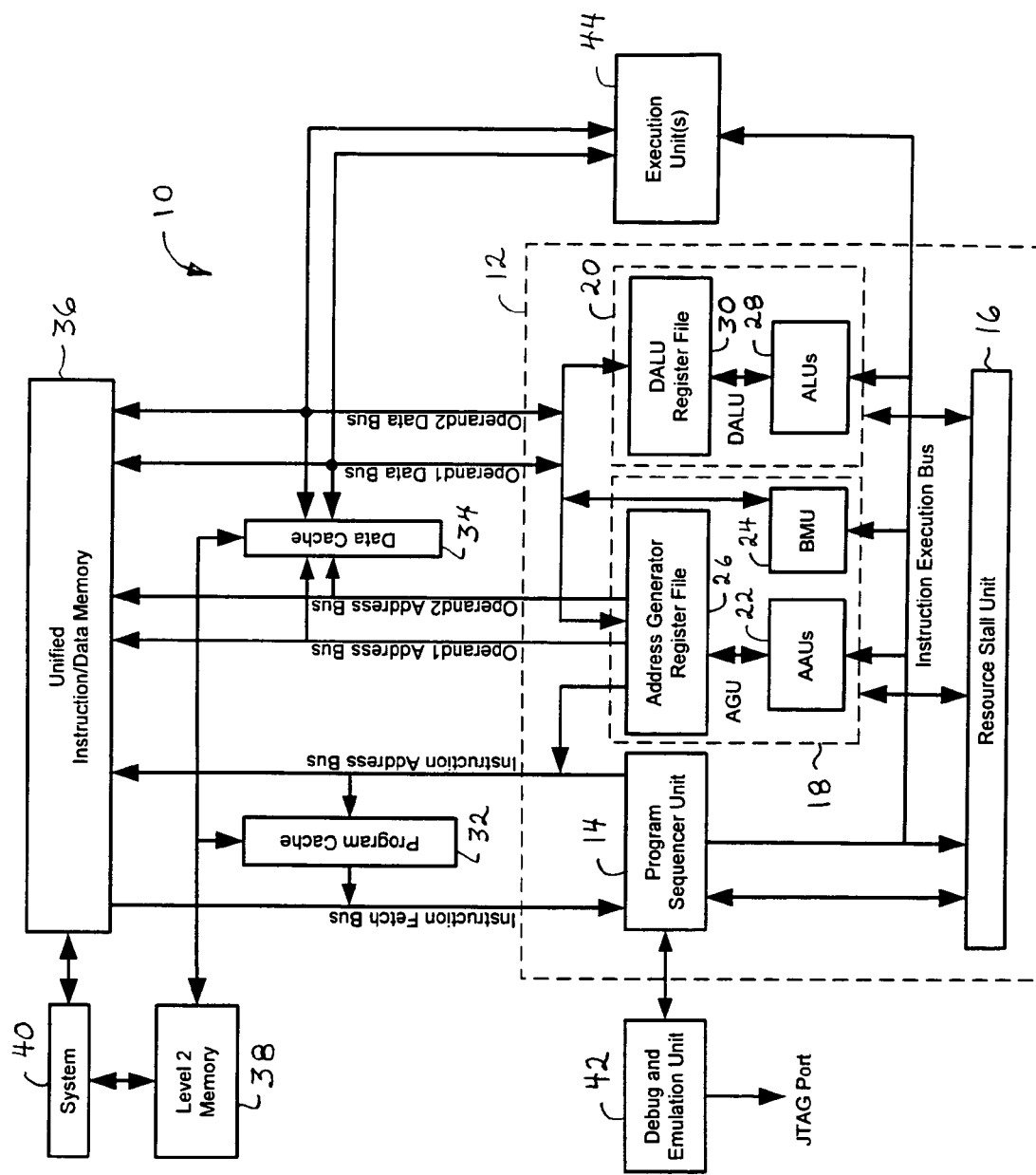
FIG. 1 is a block diagram of an example system according to the illustrative embodiment.

FIG. 1 is a block diagram of an example system, indicated generally at 10, for handling information (e.g., instructions, data, signals), according to the illustrative embodiment. In the illustrative embodiment, the system 10 is formed by various electronic circuitry components. Accordingly, the system 10 includes various units, registers, buffers, memories, and other components, which are (a) coupled to one another through buses, (b) formed by integrated circuitry in one or more semiconductor chips, and (c) encapsulated in one or more packages.

As shown in FIG. 1, the system 10 includes a core unit, indicated by a dashed enclosure 12, for performing various operations as discussed hereinbelow in connection with FIGS. 1-4. The core unit 12 includes: (a) a program sequencer unit 14; (b) a resource stall unit 16; (c) an address generation unit ("AGU"), indicated by a dashed enclosure 18; and (d) a data arithmetic logic unit ("DALU"), indicated by a dashed enclosure 20. The AGU includes arithmetic address units ("AAUs") 22, a bit mask unit ("BMU") 24, and an address generator register file 26. The DALU includes arithmetic logic units ("ALUs") 28 and a DALU register file 30. The program sequencer unit 14, resource stall unit 16, AGU 18 (including its various units and files), and DALU 20 (including its various units and files) are interconnected as shown in FIG. 1.

Further, as shown in FIG. 1, the core unit 12 is connected to a program cache 32, a data cache 34, and a unified instruction/data memory 36. The program cache 32 and data cache 34 are connected to a level-2 memory 38. The memories 36 and 38 are connected to other components 40 of the system 10.

Also, a debug & emulation unit 42 is coupled between the program sequencer unit 14 and a Joint Test Action Group ("JTAG") port for debugging and emulating various operations of the system 10, in accordance with conventional JTAG techniques. Moreover, as shown in FIG. 1, one or more additional execution unit(s) 44 is/are optionally connected to the core unit 12, data cache 34, and memory 36.

For performing its various operations, the system 10 includes various other interconnections, components (e.g., memory management circuitry) and other details that, for clarity, are not expressly shown in FIG. 1. For example, the various address buses communicate suitable control signals, in addition to address signals. Likewise, the various data buses communicate suitable control signals, in addition to data signals.

The resource stall unit 16 is responsible for controlling an interlocked pipeline of the system 10. In response to information from an instruction execution bus, the resource stall unit 16 stores information about the status (or state) of various components of the core unit 12. In response to such status (or state) information, the resource stall unit 16 resolves conflicts and hazards in the pipeline by outputting suitable information to the program sequencer unit 14, AGU 18, DALU 20, and various other components of the system 10.

For example, in response to information from the resource stall unit 16, the program sequencer unit 14 reads and dispatches instructions in order of their programmed sequence. For reading instructions, the program sequencer unit 14 outputs suitable instruction addresses to the program cache 32 and memory 36 via a 32-bit instruction address bus. Similarly, in response to information from the resource stall unit 16 and AAUs 22, the address generator register file 26 outputs suitable instruction addresses to the program cache 32 and memory 36 via the instruction address bus, as for example in response to various types of change of flow ("COF") instructions that loop, interrupt, or otherwise branch or jump away from the program sequencer unit 14 sequence of instruction addresses. Such addresses (received via the instruction address bus from either the program sequencer unit 14 or the address generator register file 26)

indicate suitable memory locations that store a sequence of instructions for execution by the system 10 ("addressed instructions").

Accordingly, in response to such addresses: (a) if the addresses are then-currently indexed in the program cache 32, the program cache 32 outputs the addressed instructions to the program sequencer unit 14 via a 128-bit instruction fetch bus; or (b) otherwise, the memory 36 outputs the addressed instructions to the program sequencer unit 14 via the instruction fetch bus. The program sequencer unit 14 receives and stores such instructions. In response to such fetched instructions, and in response to information received from the resource stall unit 16, the program sequencer unit 14 outputs (or dispatches) such instructions at suitable moments via an instruction execution bus to the resource stall unit 16, AAUs 22, BMU 22, ALUs 28, and execution unit(s) 44. The program sequencer unit 14 also includes circuitry for performing operations in support of exception processing.

The system 10 includes multiple units for executing instructions, namely the AAUs 22, BMU 24, ALUs 28, and execution unit(s) 44. In response to status (or state) information from the resource stall unit 16, such units execute one or more instructions, according to the various types of instructions (e.g., according to an instruction's particular type of operation). For example, using integer arithmetic, the AAUs 22 execute the address calculation operations of various instructions, such as COF instructions. The BMU 24 executes various instructions for shifting and masking bits in operands. The ALUs 28 execute various instructions for performing arithmetic and logical operations (e.g., numeric addition, subtraction, multiplication, and division) on operands. The execution unit(s) 44 execute various instructions for performing application-specific operations on operands in an accelerated manner.

At suitable moments, the AAUs 22 communicate with the address generator register file 26 (and vice versa) by receiving their source operand information from (and outputting their resultant destination operand information for storage to) the address generator register file 26. Likewise, at suitable moments, the ALUs 28 communicate with the DALU register file 30 (and vice versa) by receiving their source operand information from (and outputting their resultant destination operand information for storage to) the DALU register file 30.

Similarly, at suitable moments, the BMU 24, address generator register file 26, DALU register file 30, and execution unit(s) 44 communicate with the data cache 34 and/or memory 36 (and vice versa) by receiving their source operand information from (and outputting their resultant destination operand information for storage to) the data cache 34 and/or memory 36 via 64-bit operand1 and operand2 data buses. The addresses of such operand information are output from the address generator register file 26 via respective 32-bit operand1 and operand2 address buses, in response to information from the AAUs 22.

The program cache 32 and data cache 34 receive and store copies of selected information from the level-2 memory 38. In comparison to the level-2 memory 38, the program cache 32 and data cache 34 are relatively small memories with higher speed. The information in program cache 32 and data cache 34 is modifiable. Accordingly, at suitable moments, the system 10 copies such modified information from the program cache 32 and data cache 34 back to an associated entry in the level-2 memory 38 for storage, so that coherency of such modified information is maintained.

Similarly, via the other components 40 of the system 10, the level-2 memory 38 receives and stores copies of selected information from the memory 36. In comparison to the memory 36, the level-2 memory 38 is a relatively small memory with higher speed. The information in the level-2 memory 38 is modifiable, as for example when the system 10 copies modified information from the program cache 32 and data cache 34 back to an associated portion of the level-2 memory 38. Accordingly, at suitable moments, the system 10 copies such modified information from the level-2 memory 38 back to an associated entry in the memory 36 for storage, so that coherency of such modified information is maintained.

The system 10 achieves high performance by processing multiple instructions simultaneously at various ones of the AAUs 22, BMU 24, ALUs 28, and execution unit(s) 44. For example, the system 10 processes each instruction by a sequence of interlocked pipeline stages. Accordingly, the system 10 processes each stage of a particular instruction in parallel with various stages of other instructions.

In general, the system 10 operates with one machine cycle ("cycle") per stage (e.g., any stage's duration is a single machine cycle). However, some instructions (e.g., ACS, MAC, MPY and SAD, as described in Table 1) may require multiple machine cycles for execution (i.e., such instructions are executable in only multiple machine cycles of the system 10). Also, a memory access (e.g., instruction fetch or operand load) may require several machine cycles of the system 10. In response to conflicts (e.g., read/write conflicts) between instructions, the resource stall unit 16 selectively introduces one or more delays (or stalls) in finishing a particular instruction's execution stage.

TABLE 1

Instructions Having Two Machine Cycles for Execution

| Instruction & Example Assembly Syntax | Example Operation (performed by the DALU 20) |
|---|---|
| Add compare select ("ACS") ACS2 Da.X, Db.Y, Dc, Dn | Performs four (4) operations of addition/subtraction between a selection of high portion ("HP") and low portion ("LP") contents of operand registers (Da, Db, Dc, Dn). Compares and finds the maximum of the results of the first two operations, and writes the maximum result to the HP of an operand register (Dn.H). Compares and finds the maximum of the results of the last two operations, and writes the maximum result to the LP of the operand register (Dn.L). If the first operation result is greater than the second operation result, bit 32 in the destination operand register (Dn[32]) is cleared; otherwise, the bit is set. If the third operation result is greater than the fourth operation result, bit 33 in the |

TABLE 1-continued

Instructions Having Two Machine Cycles for Execution

| Instruction & Example Assembly Syntax | Example Operation (performed by the DALU 20) |
|---|---|
| | destination operand register (Dn[33]) is cleared; otherwise, the bit is set. The two HP and LP of the destination are limited to 16-bits. In case of overflow, the results are saturated to 16-bits maximum or minimum values. The extension byte of the result is undefined. |
| Multiply-accumulate signed fractions ("MAC") MAC Da, Db, Dn | Performs signed fractional multiplication of two 16-bit signed operands (Da.H/L and Db.H/L). Then adds or subtracts the product to or from a destination operand register (Dn). One operand is the HP or the LP of an operand register. The other operand is the HP or the LP of an operand register or an immediate 16-bit signed data. |
| Multiply signed fractions ("MPY") MPY Da, Db, Dn | Performs signed fractional multiplication of the high or low portions of two operand registers (Da, Db) and stores the product in a destination operand register (Dn). |
| Sum of absolute byte differences ("SAD") SAD4 Da, Db, Dn | Performs a 32-bit subtraction of source register Da from Db with the borrow disabled between bits 7 and 8, 15 and 16, and 23 and 24, so that the four bytes of each register are unsigned subtracted separately. The absolute value of each subtraction is added to the LP of the destination register Dn. The extension byte and the HP of the result are zero extended. |

In the illustrative embodiment, the system 10 processes an instruction in a sequence of ten interlocked pipeline stages, as described in Table 2, so that each instruction is processed in the same sequence of stages. During each pipeline stage, the system 10 prepares the instruction for its next stage. After the system 10 initiates an instruction's processing, the system 10 initiates the immediately subsequent instruction's processing at a later time (e.g., one machine cycle later). In that manner, the system 10 concurrently processes various stages of multiple instructions.

The multi-stage pipeline of the system 10 includes multiple execution stages. For example, in the illustrative embodiment as described in Table 2, the pipeline includes a first execution stage (E-stage) and a second execution stage (M-stage). In an alternative embodiment, the pipeline includes first and second execution stages, plus at least one additional execution stage. In such an alternative embodiment, the respective operations of the multiple execution stages are suitably established, according to the various objectives of the system 10, so that one or more of the E-stage or M-stage operations (which are described in Table 2 and elsewhere hereinbelow in connection with FIGS. 2-4) is/are performed instead (or additionally) by a suitable one or more of the multiple execution stages.

For example, in a first alternative embodiment, the additional execution stage(s) precede(s) the illustrative embodiment's first execution stage, so that the additional execution stage(s) would be immediately preceded by the C-stage in Table 2 and would perform operations accordingly. In a second alternative embodiment, the additional execution stage(s) follow(s) the illustrative embodiment's second execution stage, so that the additional execution stage(s) would be immediately followed by the W-stage in Table 2 and would perform operations accordingly. In a third alternative embodiment, one or more of the additional execution stage(s) precede(s) the illustrative embodiment's first execution stage, and one or more of the additional execution stage(s) follow(s) the illustrative embodiment's second execution stage, so that: (a) at least one of the additional execution stage(s) would be immediately preceded by the C-stage in Table 2 and would perform operations accordingly; and (b) at least one of the additional execution stage(s) would be immediately followed by the W-stage in Table 2 and would perform operations accordingly. Thus, similar to the illustrative embodiment, such alternative embodiments likewise benefit from the techniques discussed hereinbelow (in connection with FIGS. 2-4), and such techniques are likewise applicable to such alternative embodiments.

TABLE 2

Pipeline Stages Overview

| Pipeline Stage | Symbol | Description |
|---|---|---|
| Program Address | P-stage | During this machine cycle, via the instruction address bus, a suitable instruction address is output to the program cache 32 and memory 36. |
| Read Memory | R-stage | During this machine cycle, in response to the instruction address that was output during the P-stage, instructions are accessed in the program cache 32 and/or memory 36, and sixteen (16) sequential bytes of instructions are output via the instruction fetch bus from the program cache 32 and/or memory 36, according to whether the instruction address is then-currently indexed in the program cache 32. |

TABLE 2-continued

Pipeline Stages Overview

| Pipeline Stage | Symbol | Description |
| --- | --- | --- |
| Fetch | F-stage | During this machine cycle, via the instruction fetch bus, the program sequencer unit 14 receives and stores the sixteen (16) sequential bytes of instructions that were output during the R-stage. |
| VLES Dispatch | V-stage | During this machine cycle, the program sequencer unit 14 dispatches a variable length execution set ("VLES") instruction via the instruction execution bus to suitable execution units (i.e., the AAUs 22, BMU 24, ALUs 28, and execution unit(s) 44). If the instruction is a prefix instruction, which modifies the manner in which the system 10 processes subsequent instructions (e.g., if subsequent instructions are part of an alternative instruction set, which may be executed by execution unit(s) 44 to perform application-specific operations), the prefix instruction is decoded accordingly by the program sequencer unit 14 during this machine cycle. |
| Decode | D-stage | During this machine cycle, the dispatched instruction is decoded by the instruction's execution unit (i.e., the execution unit that will execute the instruction). |
| Address generation | A-stage | During this machine cycle, via the operand1 and operand2 address buses, the AGU 18 (from its address generator register file 26) outputs addresses of source operand information and destination operand information to the data cache 34 and memory 36. |
| Memory aCcess | C-stage | During this machine cycle, in response to the addresses that were output during the A-stage, source operand information is accessed in the data cache 34 and/or memory 36, and the source operand information is output via the operand1 and operand2 data buses from the data cache 34 and/or memory 36, according to whether the source operand information's address is then-currently indexed in the data cache 34. |
| Execution | E-stage | During this machine cycle, via the operand1 and operand2 data buses, the instruction's execution unit receives source operand information that was output during the C-stage. Also, during this machine cycle, the instruction's execution unit executes the instruction. |
| Mac | M-stage | During this machine cycle, if the instruction requires two machine cycles for execution, the instruction's execution unit finishes executing the instruction. Conversely, if the instruction requires only a single machine cycle for execution and is executed during the E-stage, the system 10 prepares the instruction for its W-stage, but otherwise performs no operation ("NOP") in response to the instruction during this machine cycle. |
| Write back | W-stage | During this machine cycle, via the operand1 and operand2 data buses, the instruction's execution unit outputs (or writes or stores) destination operand information to the data cache 34 and/or memory 36, according to whether the destination operand information's address is then-currently indexed in the data cache 34. |

Figure 2:
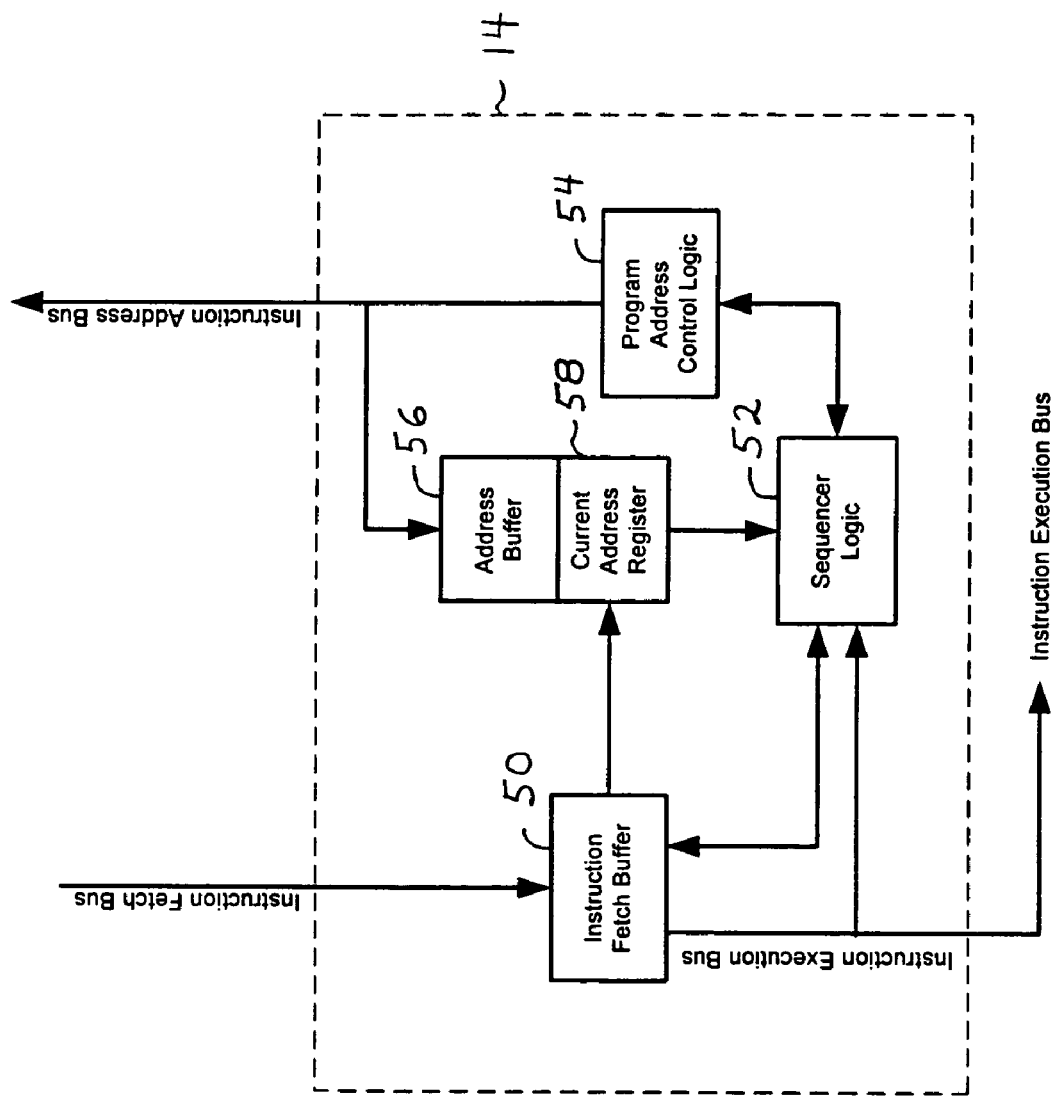
FIG. 2 is a block diagram of a program sequencer unit of the system of FIG. 1.

FIG. 2 is a block diagram of the program sequencer unit 14. As shown in FIG. 2, the program sequencer unit 14 includes an instruction fetch buffer 50, a sequencer logic 52, a program address control logic 54, an address buffer 56, and a current address register 58. Such elements of the program sequencer unit 14 perform various operations as discussed hereinbelow in connection with FIGS. 2-4.

For performing its various operations, the program sequencer unit 14 includes various other interconnections (e.g., to the resource stall unit 16), components and other details that, for clarity, are not expressly shown in FIG. 2. For example, the program address control logic 54 is connected to the instruction address bus of FIG. 1 and performs the P-stage operations of the program sequencer unit 14. During a P-stage of an instruction, if the program address control logic 54 or AGU 18 outputs an instruction address in response to a COF instruction, the address buffer 56 receives and buffers (or stores) such instruction address, at least until such instruction address is received (as discussed hereinbelow) from the address buffer 56 by the current address register 58.

The instruction fetch buffer 50 is coupled between the instruction fetch bus of FIG. 1 and the instruction execution bus of FIG. 1. In response to the program address control logic 54 performing a P-stage operation: (a) during the immediately following machine cycle(s), a corresponding R-stage operation is performed; and (b) during the immediately following machine cycle(s) after the R-stage operation is performed, the instruction fetch buffer 50 performs a corresponding F-stage operation of the program sequencer unit 14. The instruction fetch buffer 50 receives and buffers up to sixty-four (64) bytes of instructions from the instruction fetch bus.

In the absence of contrary information from the AGU 18 (in the event of a COF instruction): (a) as the instruction fetch buffer 50 performs V-stages of one or more instructions, the current address register 58 increments its latched address by the number of dispatched instruction bytes (i.e., which may be an even number ranging from 2 to 16 bytes, because the instructions are VLES instructions), which the current address register 58 receives from the instruction fetch buffer 50; and (b) in so performing an instruction's V-stage, if the instruction is processed in response to a COF instruction, the current address register 58 receives and latches a next instruction address from the address buffer 56. After so receiving and latching the next instruction address from the address buffer 56, the current address register 58 increments if necessary to ensure that its latched address is associated with the instruction whose V-stage is being performed by the instruction fetch buffer 50.

The instruction fetch buffer 50 operates as a first-in first-out queue. In the illustrative embodiment, the system 10 coordinates F-stages and V-stages of instructions in a manner that generally avoids completely filling the instruction fetch buffer 50. Nevertheless, even if the instruction fetch buffer 50 is full, it ceases being full if it performs V-stages of at least sixteen (16) bytes of instructions. This is because, during such V-stages, the instruction fetch buffer 50 outputs such buffered instructions to the instruction execution bus.

In the absence of contrary information from the sequencer unit 52 (or the AGU 18 in the event of a COF instruction), the program address control logic 54 performs the P-stage operation by outputting an instruction address that is incremented from its most recently output instruction address. Such increment is sixteen (16) (i.e., the number of bytes received by the instruction fetch buffer 50 from the instruction fetch bus during an F-stage).

The current address register 58 outputs its latched instruction address to a sequencer logic 52. The sequencer logic 52 selectively outputs signals to the instruction fetch buffer 50 and program address control logic 54. Also, the sequencer logic 52 selectively receives signals from the instruction fetch buffer 50, program address control logic 54, and current address register 58. Various example operations of the program sequencer unit 14 are discussed hereinbelow.

The system 10 has an interlock pipeline architecture, such that a particular sequence of instructions could result in a read/write conflict that delays (or stalls) operation of the system 10. It is preferable for the system 10 to avoid or reduce such delay. According to one technique, an information handling system (e.g., computer workstation) processes assembly code (which is a computer program stored on a computer-readable medium apparatus) for causing the information handling system to assemble a software program into the sequence of binary executable instructions, where the assembly code is at least partly optimized (e.g., in a manner that selectively inserts NOP instructions and other types of instructions at suitable locations in the sequence), so that such stalls are less likely when the system 10 processes the sequence. For example, the assembly code is accessible by the information handling system from a computer-readable medium apparatus (e.g., hard disk, floppy diskette, compact disc, memory device, or network connection). According to another technique, the system 10 includes circuitry for processing the sequence in a manner that reduces a likelihood of such stalls during such processing, irrespective of whether the assembly code is optimized.

Figure 3:
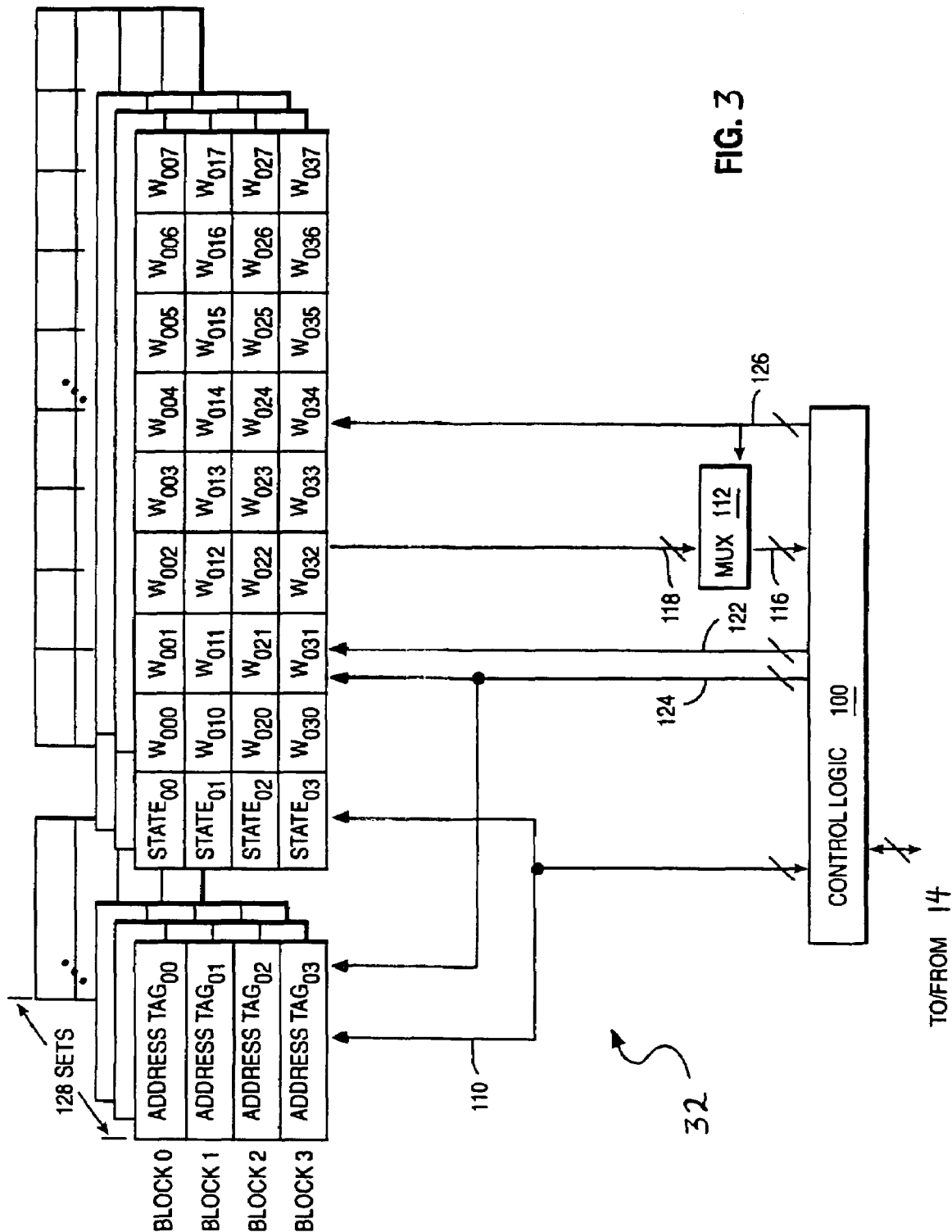
FIG. 3 is a block diagram of a program cache of the system of FIG. 1.

FIG. 3 is a block diagram of the program cache 32. The program cache 32 of FIG. 3 is likewise representative of the data cache 34. Each of the program cache 32 and the data cache 34 is a multi-way set-associative cache. In the example of FIG. 3, the multi-way set-associative cache is a four-way set-associative cache. In the illustrative embodiment, the program cache 32 and the data cache 34 are addressed in response to physical (i.e., "real") addresses. In an alternative embodiment, the program cache 32 and the data cache 34 are addressed in response to a different type of address (e.g., a virtual, effective, or other type of address).

Accordingly, FIG. 3 shows control logic 100. For example, the control logic 100 receives addresses via the instruction address bus. Each of the program cache 32 and the data cache 34 is logically arranged into 128 congruence classes (i.e., sets), as shown in FIG. 3.

As an example, for the program cache 32, each set has a respective preassigned associated group of four lines (i.e., four "ways," Blocks 0-3) within the program cache 32. Each line is able to store a respective address tag, respective state bits (e.g., including a "valid" bit), and a respective group of eight words of information. Each word has 2 bytes (i.e., 16 bits).

Accordingly, Block 3 of Set 0 is able to store an Address Tag$_{03}$, state bits State$_{03}$, and words W$_{030}$ through W$_{037}$. Likewise, each Block y of Set x is able to store digital information in (or at) an Address Tag$_{xy}$, state bits State$_{xy}$, and words W$_{xy0}$ through W$_{xy7}$, where x is a variable integer set number ranging from 0 through 127, and where y is a variable integer block number ranging from 0 through 3. For the Block y of the Set x: (a) its tag portion includes the Address Tag$_{xy}$; and (b) its non-tag portion includes the words W$_{xy0}$ through W$_{xy7}$. Also, in an illustrative embodiment, its tag portion further includes the State$_{xy}$.

In the illustrative embodiment, an address's associated Set x is specified by the address's bits $2^4$ through $2^{10}$. Thus, each set includes multiple addresses, all of which share the same seven address bits $2^4$ through $2^{10}$. Accordingly, at any single moment, the program cache 32 stores information for up to four addresses associated with (or belonging to) a particular Set x, as specified by Address Tag$_{x0}$ through Address Tag$_{x3}$ stored in Set x's associated group of four lines within the program cache 32. In FIG. 3, via the control lines 124, the control circuitry 100 specifies the Set x to the program cache 32 (in response to the address's bits $2^4$ through $2^{10}$).

For example, (a) in Block 0 of Set 0, the program cache 32 can store Address Tag$_{00}$ including a first address's bits $2^{11}$ through $2^{31}$, (b) in Block 1 of Set 0, the program cache 32 can store Address Tag$_{01}$, including a second address's bits $2^{11}$ through $2^{31}$, (c) in Block 2 of Set 0, the program cache 32 can store Address Tag$_{02}$ including a third address's bits $2^{11}$ through $2^{31}$, and (d) in Block 3 of Set 0, the program cache 32 can store Address Tag$_{03}$ including a fourth address's bits $2^{11}$ through $2^{31}$. Thus, each Address Tag$_{xy}$ has 21 bits. In response to an address's associated Set x, the program cache 32 outputs: (a) tag information from the Address Tags$_{xy}$ in each Block y of the multiplexed Set x; and (b) state information from the State$_{xy}$ in each Block y of the multiplexed Set x.

Each 21-bit Address Tag,y is a respective group of 21 memory memorycells (i.e., each capable of storing a respective single bit of digital information). Similarly, each 16-bit word W$_{xyz}$ is a respective group of 16 memory cells. Likewise, the number of memory cells in each State$_{xy}$ is equal to the number of bits per State$_{xy}$.

Accordingly, each word W$_{xyz}$ (where z is an integer word number from 0 through 7) has 16 bits. In response to an address's associated Set x and associated Block y, the control logic 100 outputs suitable control signals (to the program cache 32 through enable lines 126) for enabling (or activating) only 128 memory cells (i.e., 16 bits multiplied by 8 words) to output information from the words $W_{xyz}$ of the address's associated Block y in the multiplexed Set x (which, likewise, is associated with the address).

The program cache 32 includes: (a) 128 sets of 21 memory cells that are denoted as Address $Tag_{x0}$ (where x is the address's associated set number); (b) 128 sets of 21 memory cells that are denoted as Address $Tag_{x1}$; (c) 128 sets of 21 memory cells that are denoted as Address $Tag_{x2}$; and (d) 128 sets of 21 memory cells that are denoted as Address $Tag_{x3}$.

Likewise, the program cache 32 includes: (a) 128 sets of memory cells that are denoted as $State_{x0}$; (b) 128 sets of 21 memory cells that are denoted as $State_{x1}$; (c) 128 sets of 21 memory cells that are denoted as $State_{x2}$; and (d) 128 sets of 21 memory cells that are denoted as $State_{x3}$.

In the program cache 32, each memory cell has an enable line for selectively: (a) enabling (or applying) power to the memory cell; or (b) disabling (or removing) at least some power from the memory cell. In FIG. 3, enable lines 126 include: (a) 4 block enable lines (i.e., 4 blocks*1 block enable line per block); and (b) 128 set enable lines (i.e., 128 sets*1 set enable line per set). Such block enable lines and set enable lines are connected from the control logic 100 to the words $W_{xyz}$, so that the control circuitry 100 is operable to control the enable lines 126 for reading information from the words $W_{xyz}$ of a Block y in an address's associated Set x.

If a memory cell is not activated (e.g., disabled, so that at least some power is removed from the memory cell), the system 10 consumes less power. Conversely, if a memory cell is activated (e.g., enabled, so that power is applied to the memory cell), the system 10 consumes more power.

Through a bus 110, address tag information is transferred between the control logic 100 and Address $Tag_{xy}$, and state information is transferred between the control logic 100 and $State_{xy}$. Through a bus 122, instruction information (or data information in the case of the data cache 34 ) is transferred from the control logic 100 to words $W_{xyz}$ of a Block y in a multiplexed Set x for storage (e.g., in performing a write operation).

Figure 4:
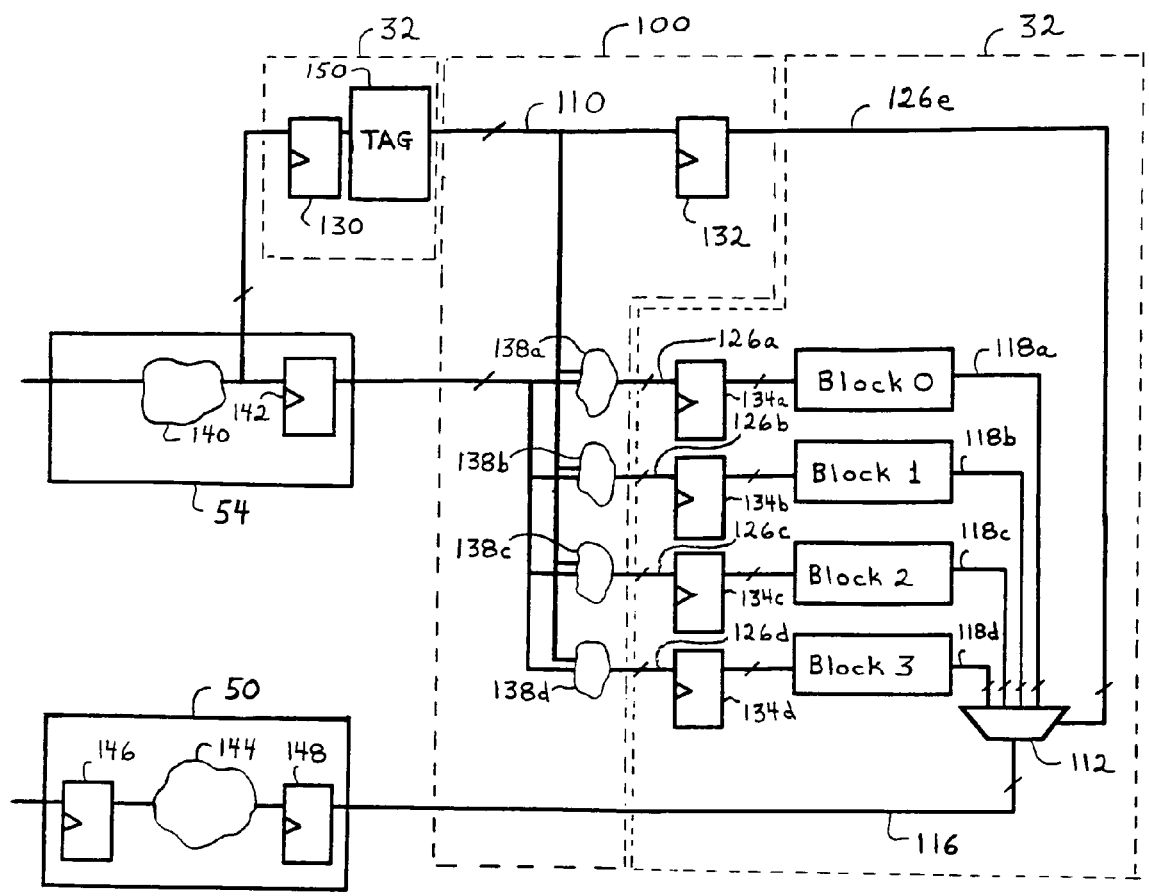
FIG. 4 is a block diagram of the program cache of FIG. 3, an instruction fetch buffer of FIG. 2, a program address control logic of FIG. 2, and a control logic of FIG. 3.

FIG. 4 is a block diagram of the program cache 32, instruction fetch buffer 50, program address control logic 54, and control logic 100. As shown in the example of FIG. 4, the system 10 includes synchronously operated stages, which include latches 130 (of the program cache 32 ), 132 (of the control logic 100 ), 134a-d (of the program cache 32 ), 142 (of the program address control logic 54 ), and 146 and 148 (of the instruction fetch buffer 50). Also, the control logic 100 includes combinational logic circuitry 138a-d. The program cache 32 includes a tag portion 150, which includes the Address $Tag_{xy}$ and $State_{xy}$ portions of the program cache 32.

FIG. 4 shows the control logic 100 coupled to various elements of the program cache 32 and the program sequencer unit 14 (e.g., including the instruction fetch buffer 50 and program address control logic 54). As shown in FIG. 4, the program address control logic 54 includes combinational logic circuitry 140 and the latch 142. Also, the instruction fetch buffer 50 includes combinational logic circuitry 144 and the latches 146 and 148. Moreover, FIG. 4 shows that: (a) the enable lines 126 are formed by 126a, 126b, 126c, 126d and 126e; and (b) groups of information lines 118a-d together form a bus 118.

Block 0 of the program cache 32 is coupled between the enable lines 126a and the group of lines 118a. Block 1 of the program cache 32 is coupled between the enable lines 126b and the group of lines 118b. Block 2 of the program cache 32 is coupled between the enable lines 126c and the group of lines 118c. Block 3 of the program cache 32 is coupled between the enable lines 126d and the group of lines 118d.

The latches 130, 132, 134a-d, 142, 146 and 148 are synchronously clocked in response to an active edge transition of a shared clock signal which, for clarity, is not expressly shown in FIG. 4. Likewise, for performing their various operations, the program sequencer unit 14, program cache 32, instruction fetch buffer 50, program address control logic 54, and control logic 100 include various other interconnections, components and other details that, for clarity, are not expressly shown in FIG. 4.

In an example instruction fetch operation, the combinational logic circuitry 140 of the program address control logic 54 determines a then-current instruction fetch address. Before the determined fetch address is latched in the program address control logic 54, it is output from the combinational logic circuitry 140 to the control logic 100 (and, accordingly, is received by the control logic 100).

Accordingly, in response to the same active edge transition of the shared clock signal (i.e., in response to the start of a clock cycle k of the system 10), the determined fetch address is substantially concurrently first latched by both: (a) the latch 142 of the program address control logic 54; and (b) the latch 130 of the program cache 32. During the clock cycle k: (a) in response to the address that is latched by the latch 130, the tag portion 150 of the program cache 32 identifies (or determines) the latched address's associated Set x in response to the latched address's bits $2^4$ through $2^{10}$ (as discussed hereinabove); (b) for the associated Set x, through the bus 110, the tag portion 150 reads the four address tags, Address $Tag_{x0}$, Address $Tag_{x1}$, Address $Tag_{x2}$ and Address $Tag_{x3}$, and their respectively associated four states, $State_{x0}$, $State_{x1}$, $State_{x2}$ and $State_{x3}$; (c) the tag portion 150 compares the latched address's bits $2^{11}$ through $2^{31}$ (received from the latch 130) against any valid one(s) of such four address tags (validity of an Address $Tag_{xy}$ is indicated by a digital logic value of the "valid" bit in $State_{xy}$ associated with Address $Tag_{xy}$); (d) in response to such a comparison, if the latched address's bits $2^{11}$ through $2^{31}$ are a match with any such valid Address $Tag_{xy}$, the tag portion 150 outputs an identification of the matching Block y (if any) to the latch 132 and to the combinational logic circuitry 138a-d, which accordingly receive such identification (e.g., identification in the form of suitable control signals); (e) the latch 142 outputs its latched address to the combinational logic circuitry 138a-d via the instruction address bus, which accordingly receive such latched address; and (f) in response to the address that is latched by the latch 142, and in response to the identification of the matching Block y, the combinational logic circuitry 138a-d outputs suitable control signals (to the latches 134a-d, which accordingly receive such control signals) for enabling only 128 of the memory cells (in the program cache 32) to output information from the words $W_{xyz}$ of the matching Block y in the address's associated Set x.

Accordingly, in response to the start of a next clock cycle k+1: (a) such control signals from the combinational logic circuitry 138a-d are latched by the latches 134a-d, respectively; and (b) the identification of the matching Block y is latched by the latch 132. During the clock cycle k+1: (a) the latches 134a-d output such control signals (to the program cache 32 through enable lines 126a, 126b, 126c and/or 126d) for enabling only 128 of the memory cells (in the program cache 32 ) to output information from the words $W_{xyz}$ of the matching Block y in the address's associated Set x; (b) the latch 132 outputs the identification of the matching Block y to the multiplexer 112 through enable lines 126e; (c) in response to such control signals, the matching Block y of the program cache 32 outputs information from its words $W_{xyz}$ of the address's associated Set x to the multiplexer 112 via the group of lines 118a, 118b, 118c or 118d that is coupled to the matching Block y; (d) in response to the identification of the matching Block y from the latch 132, the multiplexer 112 outputs information from such words $W_{xyz}$ of the address's associated Set x to the latch 148 via the control logic 100 and bus 116.

In response to the start of a next clock cycle k+2, the latch 148 receives and stores such information from the words $W_{wyz}$. Accordingly, via the control logic 100 and bus 116, the multiplexer 112 outputs (to the latch 148) either: (a) the words $W_{x00}$ through $W_{x07}$ if the match is with Address $Tag_{x0}$, (b) the words $W_{x10}$ through $W_{x17}$, if the match is with Address $Tag_{x1}$, (c) the words $W_{x20}$ through $W_{x27}$ if the match is with Address $Tag_{x2}$, or (d) the words $W_{x30}$ through $W_{x37}$ if the match is with Address $Tag_{x3}$.

Because the determined fetch address is substantially concurrently first latched by both latches 130 and 142, sufficient time is available for the control logic 100 to perform its operations, before the control logic 100 outputs the control signals (to the program cache 32 through enable lines 126a, 126b, 126c and/or 126d) to identify the matching Block y (if any). In that manner, the control logic 100 avoids concurrent enabling of all of the memory cells in the program cache 32. Because the control logic 100 enables only a selected subset (instead of all) of such memory cells, while non-selected subgroups (e.g., non-matching blocks) of such memory cells are at least partly disabled, the system 10 activates fewer memory cells of the program cache 32 during each instruction fetch operation, so that average power consumption of the program cache 32 (and hence of the system 10) is reduced. The selected subset of memory cells stores digital information at the words $W_{xyz}$ in the matching Block y of the address's associated Set x. In an illustrative embodiment, the non-selected subgroups (e.g., non-matching blocks) of such memory cells are fully disabled from outputting digital information to the bus 118 from their words $W_{xyz}$, but such digital information continues being stored at (or in or by) such words $W_{xyz}$.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. Apparatus for a Y-way set-associative cache memory (e.g., 32) having Y>1 blocks and X>1 sets, wherein each block y, $0 \leq y \leq (Y-1)$, of each set x, $0 \leq x \leq (X-1)$, is adapted to store an address tag (e.g., $Tag_{xy}$), a state (e.g., $State_{xy}$), and Z words (e.g., $W_{xyz}$), $0 \leq z \leq (Z-1)$, the apparatus comprising:
   first circuitry (e.g., 130 and 150) adapted to (1) receive a fetch address, (2) determine a set associated with the fetch address, (3) read Y address tags and Y states corresponding to the associated set, (4) determine which of the Y address tags are valid based on the Y states, (5) compare the fetch address to one or more valid address tags, and (6) generate, if one of the valid address tags matches the fetch address, a first control signal (e.g., 110) indicating that the block associated with the matching valid address tag is a matching block;
   second circuitry (e.g., 132, 138a-d, and 134a-d) adapted to (1) receive the fetch address, (2) receive the first control signal generated by the first circuitry, (3) generate a second control signal (e.g., 126e) based on the first control signal and indicating the matching block, (4) generate block-enable control signals (e.g., 126a-d) for the cache memory, (5) apply the block-enable control signals to the cache memory, such that the matching block in the cache memory is enabled and the (Y−1) other blocks in the cache memory are at least partly disabled, and (6) apply the fetch address to the cache memory to read one or more associated words from the enabled matching block; and
   third circuitry (e.g., 112) connected to an output of each block of the cache memory and adapted to (1) receive the second control signal generated by the second circuitry, (2) receive the one or more associated words from the enabled matching block, and (3) select the one or more associated words for output from the cache memory based on the second control signal, wherein:
   the first circuitry comprises a first latch (e.g. 130) adapted to latch the fetch address;
   the second circuitry comprises:
      a second latch (e.g. 132) adapted to latch the first control signal and output the second control signal; and
      a plurality of other latches (e.g., 134a-d) adapted to latch the block-enable control signals; and
   the third circuitry comprises a multiplexer (e.g. 112) adapted to receive the outputs from the blocks and select the one or more associated words from the enabled matching block based on the second control signal from the second latch.

2. The invention of claim 1, wherein power consumed by each of the (Y−1) at least partly disabled blocks is less than power consumed by the enabled matching block.

3. The invention of claim 1, wherein:
   during a clock cycle k:
      the first circuitry (1) receives the fetch address, (2) determines the associated set, (3) reads the Y address tags and the Y states corresponding to the associated set, (4) determines the one or more valid address tags, (5) compares the fetch address to the one or more valid address tags, and (6) generates the first control signal; and
      the second circuitry (1) receives the fetch address, (2) receives the first control signal, and (3) generates the block-enable control signals; and
   during a next clock cycle k+1:
      the second circuitry (1) generates the second control signal, (2) applies the block-enable control signals to the cache memory to enable the matching block and at least partly disable the (Y−1) other blocks and (3) applies the fetch address to the cache memory to read the one or more associated words from the enabled matching block; and
      the third circuitry (1) receives the second control signal, (2) receives the one or more associated words from the enabled matching block, and (3) selects the one or more associated words for output from the cache memory based on the second control signal.

4. A method for operating a Y-way set-associative cache memory (e.g., 32) having Y>1 blocks and X>1 sets, wherein each block y, $0 \leq y \leq (Y-1)$, of each set x, $0 \leq x \leq (X-1)$, stores an address tag (e.g., $Tag_{xy}$), a state (e.g., $State_{xy}$), and Z words (e.g., $W_{xyz}$), $0 \leq z \leq (Z-1)$, the method comprising:

(1) receiving a fetch address;
(2) determining a set associated with the fetch address;
(3) reading Y address tags and Y states corresponding to the associated set;
(4) determining which of the Y address tags are valid based on the Y states;
(5) comparing the fetch address to one or more valid address tags; and
(6) generating, if one of the valid address tags matches the fetch address, a first control signal (e.g., 110) indicating that the block associated with the matching valid address tag is a matching block;
(7) generating block-enable control signals (e.g., 126*a-d*) for the cache memory;
(8) generating a second control signal (e.g., 126*e*) based on the first control signal and indicating the matching block;
(9) applying the block-enable control signals to the cache memory, such that the matching block in the cache memory is enabled and the (Y−1) other blocks in the cache memory are at least partly disabled;
(10) applying the fetch address to the cache memory to read one or more associated words from the enabled matching block; and
(11) selecting the one or more associated words for output from the cache memory based on the second control signal, wherein:
  step (1) comprises latching the fetch address;
  step (7) comprises latching the block-enable control signals;
  step (8) comprises latching the first control signal to output the second control signal; and
  step (11) comprises muxing outputs from the blocks to select the one or more associated words from the enabled matching block based on the second control signal.

5. The invention of claim 4, wherein power consumed by each of the (Y−1) at least partly disabled blocks is less than power consumed by the enabled matching block.

6. The invention of claim 4, wherein:
a clock cycle k comprises (1) receiving the fetch address, (2) determining the associated set, (3) reading the Y address tags and the Y states corresponding to the associated set, (4) determining the one or more valid address tags, (5) comparing the fetch address to the one or more valid address tags, (6) generating the first control signal, and (7) generating the block-enable control signals; and
a next clock cycle k+1 comprises (8) generating the second control signal, (9) applying the block-enable control signals to the cache memory to enable the matching block and at least partly disable the (Y−1) other blocks, (10) applying the fetch address to the cache memory to read the one or more associated words from the enabled matching block, and (11) selecting the one or more associated words for output from the cache memory based on the second control signal.

7. A Y-way set-associative cache memory (e.g., 32) comprising:
Y>1 blocks and X>1 sets, wherein each block y, $0 \leq y \leq (Y-1)$, of each set x, $0 \leq x \leq (X-1)$, is adapted to store an address tag (e.g., $Tag_{xy}$), a state (e.g., $State_{xy}$), and Z words (e.g., $W_{xyz}$), $0 \leq z \leq (Z-1)$;
first circuitry (e.g., 130 and 150) adapted to (1) receive a fetch address, (2) determine a set associated with the fetch address, (3) read Y address tags and Y states corresponding to the associated set, (4) determine which of the Y address tags are valid based on the Y states, (5) compare the fetch address to one or more valid address tags, and (6) generate, if one of the valid address tags matches the fetch address, a first control signal (e.g., 110) indicating that the block associated with the matching valid address tag is a matching block;
second circuitry (e.g., 132, 138*a-d*, and 134*a-d*) adapted to (1) receive the fetch address, (2) receive the first control signal generated by the first circuitry, (3) generate a second control signal (e.g., 126*e*) based on the first control signal and indicating the matching block, (4) generate block-enable control signals (e.g., 126*a-d*) for the cache memory, (5) apply the block-enable control signals to the cache memory, such that the matching block in the cache memory is enabled and the (Y−1) other blocks in the cache memory are at least partly disabled, and (6) apply the fetch address to the cache memory to read one or more associated words from the enabled matching block; and
third circuitry (e.g., 112) connected to an output of each block of the cache memory and adapted to (1) receive the second control signal generated by the second circuitry, (2) receive the one or more associated words from the enabled matching block, and (3) select the one or more associated words for output from the cache memory based on the second control signal, wherein:
  the first circuitry comprises a first latch (e.g., 130) adapted to latch the fetch address;
  the second circuitry comprises:
    a second latch (e.g., 132) adapted to latch the first control signal and output the second control signal; and
    a plurality of other latches (e.g., 134*a-d*) adapted to latch the block-enable control signals; and
  the third circuitry comprises a multiplexer (e.g., 112) adapted to receive the outputs from the blocks and select the one or more associated words from the enabled matching block based on the second control signal from the second latch.

8. The invention of claim 7, wherein power consumed by each of the (Y−1) at least partly disabled blocks is less than power consumed by the enabled matching block.

9. The invention of claim 7, wherein:
during a clock cycle k:
  the first circuitry (1) receives the fetch address, (2) determines the associated set, (3) reads the Y address tags and the Y states corresponding to the associated set, (4) determines the one or more valid address tags, (5) compares the fetch address to the one or more valid address tags, and (6) generates the first control signal; and
  the second circuitry (1) receives the fetch address, (2) receives the first control signal, and (3) generates the block-enable control signals; and
during a next clock cycle k+1:
  the second circuitry (1) generates the second control signal, (2) applies the block-enable control signals to the cache memory to enable the matching block and at least partly disable the (Y−1) other blocks and (3) applies the fetch address to the cache memory to read the one or more associated words from the enabled matching block; and
  the third circuitry (1) receives the second control signal, (2) receives the one or more associated words from the enabled matching block, and (3) selects the one or more associated words for output from the cache memory based on the second control signal.

* * * * *